United States Patent [19]

Ku

[11] Patent Number: 5,217,116
[45] Date of Patent: Jun. 8, 1993

[54] BICYCLE KETTLE SUPPORT WITH A TOOL-STORING BOX

[76] Inventor: Cooper Ku, Floor 5th 93 Tien Mu E. Rd., Taipei, Taiwan

[21] Appl. No.: 835,420

[22] Filed: Feb. 14, 1992

[51] Int. Cl.⁵ ............................................. B65D 85/28
[52] U.S. Cl. .................................. 206/374; 81/177.4; 81/490; 206/377; 220/23.86
[58] Field of Search .................. 248/311.2, 310, 309.1; 220/23.86, 529; 206/372, 373, 379, 374, 375, 377; 81/490, 177.4

[56] References Cited

U.S. PATENT DOCUMENTS

| | | | |
|---|---|---|---|
| 3,983,993 | 10/1976 | Hsu | 220/23.86 X |
| 4,534,474 | 8/1985 | Ng | 220/23.86 X |
| 4,911,295 | 3/1990 | Venegoni | 206/372 |
| 5,056,923 | 11/1991 | Hoefer et al. | 220/529 X |
| 5,102,086 | 4/1992 | Thomason | 248/311.2 |

Primary Examiner—Ramon O. Ramirez
Attorney, Agent, or Firm—Jacobson, Price, Holman & Stern

[57] ABSTRACT

A bicycle kettle support with a tool-storing box including a kettle support haing a lower threaded portion, and a tool box composed of multiple layers of box members and screwed on the lower threaded portion of the kettle support, wherein each of the box members is divided into several chambers by partitioning boards for containing various tools and a cap is rotatably mounted over the box member by a shaft, the cap being formed with an opening corresponding to the shape of the chamber, whereby the cap can be rotated through a certain angle to make the opening aligned with the chamber for the user to take out the tools contained therein while closing other chambers to prevent the tools stored therein from dropping out, the lateral wall of at least one of the box members being formed with a tool insert hole so that the tool can be inserted thereinto, permitting the box member to serve as a handle to increase the wrenching torque exerted on the tool.

2 Claims, 2 Drawing Sheets

BICYCLE KETTLE SUPPORT WITH A TOOL-STORING BOX

BACKGROUND OF THE INVENTION

The present invention relates to a bicycle kettle support with a tool-storing box, and more particularly to a bicycle kettle support having a base equipped with a small tool box, which is adapted to contain the tools used in a bicycle.

A conventional bicycle kettle support is a simple support mounted on a middle frame of a bicycle so that a kettle can be placed therein. Such a kettle support has no other function. Moreover, the current bicycle is designed with a light weight and simple structure while lacking auxiliary equipment such as a repair tool box. As a result, on the occasion of failure of the bicycle, much inconvenience will be caused. Therefore, a suitable tool box, which can be mounted on a bicycle to store necessary tools while free from large volume and heavy weight is needed. Such a tool box is preferably associated with a kettle support which is most commonly disposed on a bicycle so as to reduce the occupied space.

SUMMARY OF THE INVENTION

It is therefore an object of this invention to provide a bicycle kettle support having a base associated with multiple small tool boxes in a screwing manner to contain many small tools so that the kettle support not only can hold a kettle but also can carry a set of tools for the bicycle.

According to the above object, the present tool box is partitioned into several chambers and a cap formed with an opening corresponding to the shape of the chamber is rotatably mounted over the tool box by a shaft member, whereby the cap can be rotated through a certain angle, making the opening aligned with one of the chambers for the user to take out the tool contained in the chamber. In addition, a tool insert hole is formed on the lateral wall of the box, permitting the tools, such as a wrench, to be inserted thereinto so that the tool box can serve as a handle portion to enhance the holding of the tool and increasing the wrenching torque exerted on the tool.

The present invention can be best understood through the following description and accompanying drawings, wherein:

BRIEF DESCRIPTION OF THE DRAWINGS

FIG. 1 is a perspective assembled view of the present invention; and.

DETAILED DESCRIPTION OF THE PREFERRED EMBODIMENT

Figure 1:
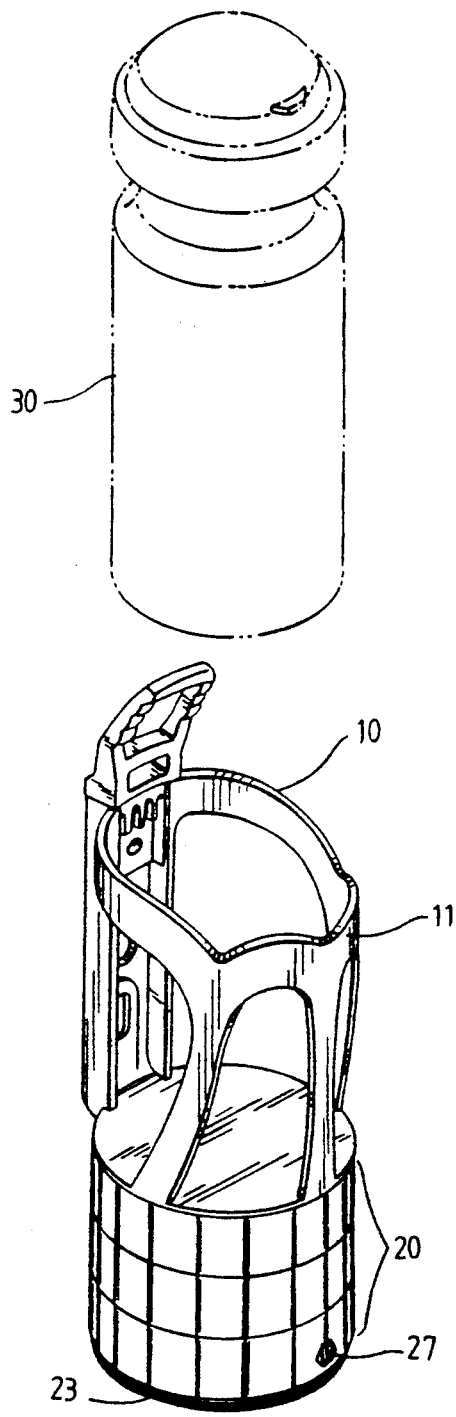
Figure 2:
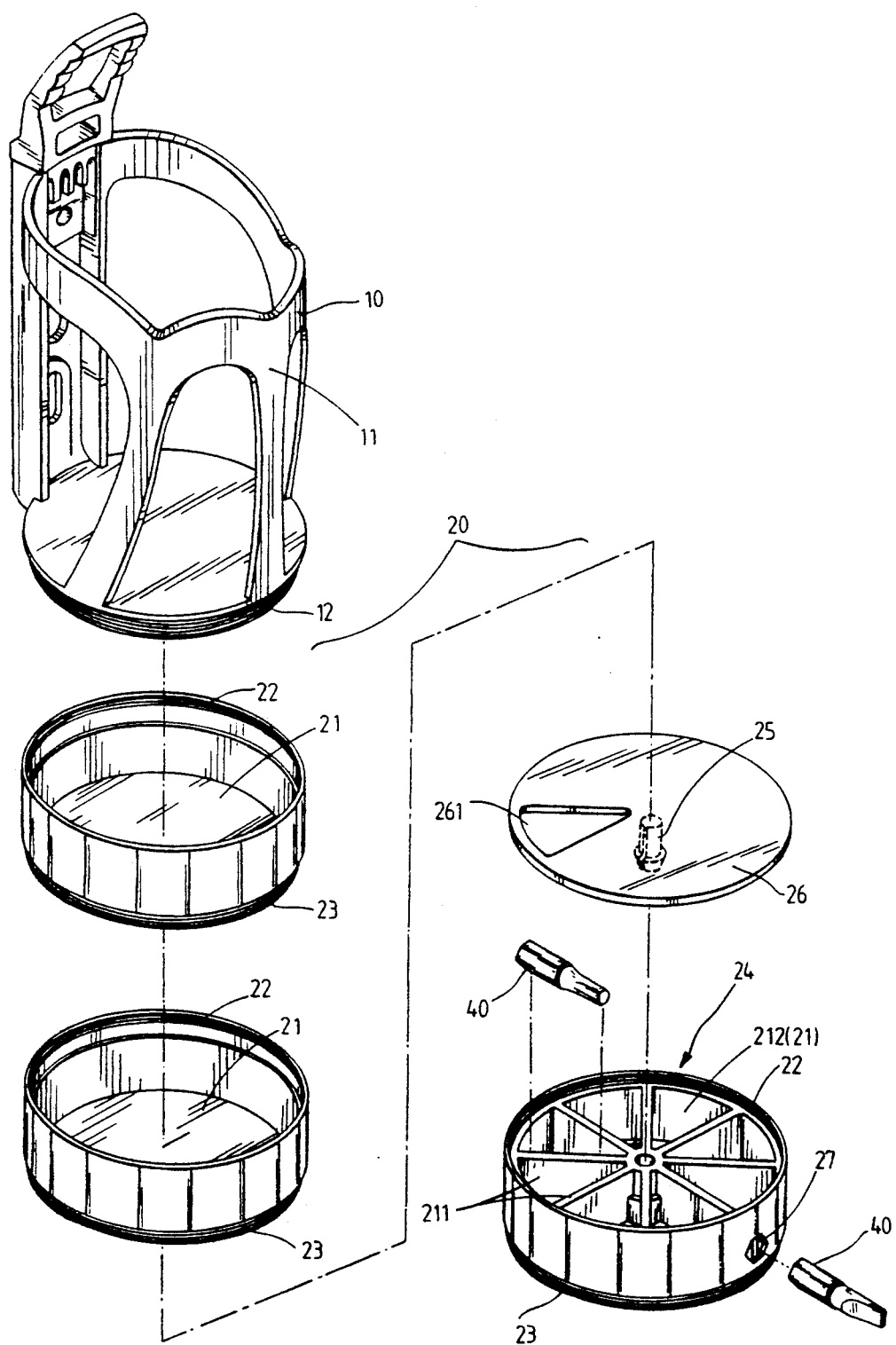
FIG. 2 is a perspective exploded view of the present invention.

Please refer to FIGS. 1 and 2. The present invention includes a kettle support 10 having an upper annular frame 11 for holding a kettle. The lower end of the support 10 is formed with a threaded portion 12 on which a tool box 20 is screened.

The tool box 20 is composed of several box members each of which includes an inner room 21, upper inner threads 22 and lower outer threads 23. By means of the inner and outer threads 22, 23, the box members can be associated together to form the tool box 20. The inner room 21 of the box member can be divided by multiple partitioning boards 211 into several chambers 212 for storing various tools and a cap 26 is rotatably mounted over the box member by a shaft 25 to cover an upper open side 24 thereof. The cap 26 is formed with an opening 261 corresponding to the shape of the chamber 212 whereby the cap can be rotated through a certain angle to make the opening 261 aligned with the chamber 212 for the user to take out the tools 40 contained therein while closing other chambers 212 to prevent the tools stored therein from dropping out. The lateral wall of the tool box 20 is further formed with a tool insert hole 27 corresponding to the specification of the tool 40 so that the tool 40 can be inserted thereinto to enhance the stability of the tool when used and increase the wrenching torque exerted thereon.

The scope of the present invention is not limited by the above embodiment and should be defined by the following claims.

What is claimed is:

1. A bicycle kettle support with a tool-storing box, comprising a kettle support having an upper annular frame for holding a kettle and a lower threaded portion on which a tool box is screwed, said tool box being composed of multiple box members each of which includes an inner room for containing a set of tools, upper inner thread and lower outer thread, wherein said box members can be associated together to form said tool box in a screwing manner.

2. A bicycle kettle support as claimed in claim 1, wherein said tool box is constructed by screwing said box members on one another in sequence, and said inner room of at least one of said box members is divided into several chambers by multiple partitioning boards, a cap being rotatably mounted over said at least one box member by a shaft to cover an upper open side thereof, said cap being formed with an opening corresponding to the shape of said chamber, wherein said cap can be rotated through a certain angle to make said opening aligned with said chamber for the user to take out the tools contained therein while closing other chambers to prevent the tools stored therein from dropping out, a lateral wall of said tool box being formed with a tool insert hole corresponding to the specification of a tool so that the tool can be inserted thereinto for the convenience of use.

* * * * *